United States Patent
Abu El Ata (10) Patent No.: US 6,990,437 B1
(45) Date of Patent: *Jan. 24, 2006

(54) SYSTEMS AND METHOD FOR DETERMINING PERFORMANCE METRICS FOR CONSTRUCTING INFORMATION SYSTEMS

(76) Inventor: Nabil A. Abu El Ata, 1820 S. 181st, Omaha, NE (US) 68130

( * ) Notice: Subject to any disclaimer, the term of this patent is extended or adjusted under 35 U.S.C. 154(b) by 989 days.

This patent is subject to a terminal disclaimer.

(21) Appl. No.: 09/606,869

(22) Filed: Jun. 29, 2000

Related U.S. Application Data (60) Provisional application No. 60/142,313, filed on Jul. 2, 1999.

(51) Int. Cl.
*G06F 13/00* (2006.01)
*G06F 12/08* (2006.01)

(52) U.S. Cl. .................. 703/2; 703/22; 707/2; 711/159

(58) Field of Classification Search .................... 703/2, 703/22; 707/2, 102, 5, 513; 709/220, 221, 709/223; 705/7, 35; 715/513; 711/159
See application file for complete search history.

(56) References Cited

U.S. PATENT DOCUMENTS

| | | | |
|---|---|---|---|
| 5,146,591 A | 9/1992 | Bachman et al. ........... 395/600 |
| 5,193,183 A | 3/1993 | Bachman .................... 395/600 |
| 5,195,178 A | 3/1993 | Krieger et al. .............. 395/157 |
| 5,208,765 A | 5/1993 | Turnbull |
| 5,233,513 A | 8/1993 | Doyle |
| 5,241,645 A | 8/1993 | Cimral et al. ............... 395/500 |
| 5,276,877 A | 1/1994 | Friedrich et al. ........... 709/105 |
| 5,297,279 A | 3/1994 | Bannon et al. |
| 5,446,874 A | 8/1995 | Waclawsky et al. ........... 714/1 |
| 5,486,995 A | 1/1996 | Krist et al. ................. 364/149 |
| 5,522,014 A | 5/1996 | Clark et al. .................... 706/45 |
| 5,539,652 A | 7/1996 | Tegethoff |
| 5,680,590 A | 10/1997 | Parti .......................... 395/500 |
| 5,724,556 A | 3/1998 | Souder et al. .............. 395/500 |
| 5,724,569 A | 3/1998 | Andres ....................... 395/602 |
| 5,726,914 A | 3/1998 | Janovski et al. ............. 702/84 |
| 5,729,746 A | 3/1998 | Leonard |
| 5,771,370 A | 6/1998 | Klein .................... 395/500.34 |
| 5,790,789 A | 8/1998 | Suarez ....................... 709/202 |
| 5,801,958 A | 9/1998 | Dangelo et al. ............. 364/489 |
| 5,809,282 A | 9/1998 | Cooper et al. .............. 709/226 |
| 5,822,749 A * | 10/1998 | Agarwal ....................... 707/2 |
| 5,881,268 A | 3/1999 | McDonald et al. .... 395/500.44 |
| 5,893,074 A | 4/1999 | Hughes et al. ................. 705/8 |
| 5,937,165 A | 8/1999 | Schwaller et al. |

(Continued)

OTHER PUBLICATIONS

Ata, N., "How we Avoided Murphy's Law at the Italian Stock Exchange", CMG 1997, consisting of 7 pages.

(Continued)

*Primary Examiner*—Thai Phan
(74) *Attorney, Agent, or Firm*—Hamilton, Brook, Smith & Reynolds, P.C.

(57) ABSTRACT

A method and apparatus for designing an optimal IS architecture of a business entity is disclosed. In different levels of abstraction, a business operations model, an applications model, a physical requirements model and technical infrastructure model are produced. The models in a stepwise manner generate an IS architecture meeting desired performance criteria of the business entity. An optimizer evaluates, in a numerical manner, implementations of the IS architecture and design alternatives such that an optimal IS architecture is determined. Subsequent continual refinement of the IS architecture is achieved by remodeling the physical requirements and the technical infrastructure, and by evaluating through the optimizer the then produced IS architecture.

29 Claims, 3 Drawing Sheets

U.S. PATENT DOCUMENTS

| | | | |
|---|---|---|---|
| 5,953,707 A | 9/1999 | Huang et al. | 705/10 |
| 5,958,009 A | 9/1999 | Friedrich et al. | 709/224 |
| 5,984,511 A | 11/1999 | Vasey-Glandon et al. | 364/512 |
| 5,999,734 A | 12/1999 | Willis et al. | 395/706 |
| 6,003,079 A | 12/1999 | Friedrich et al. | 709/224 |
| 6,009,256 A | 12/1999 | Tseng et al. | 395/500.34 |
| 6,023,706 A * | 2/2000 | Schmuck et al. | 707/200 |
| RE36,602 E | 3/2000 | Sebastian et al. | |
| 6,038,540 A | 3/2000 | Krist et al. | 705/8 |
| 6,067,412 A | 5/2000 | Blake et al. | |
| 6,115,718 A * | 9/2000 | Huberman et al. | 707/102 |
| 6,119,125 A | 9/2000 | Glouderman et al. | |
| 6,145,121 A | 11/2000 | Levy et al. | |
| 6,272,507 B1 * | 8/2001 | Pirolli et al. | 715/513 |
| 6,311,144 B1 * | 10/2001 | Abu El Ata | 703/2 |
| 6,327,551 B1 | 12/2001 | Peterson et al. | |
| 6,370,681 B1 | 4/2002 | Dellarocas et al. | |
| 6,393,386 B1 | 5/2002 | Zager et al. | 703/25 |
| 6,532,465 B2 | 3/2003 | Hartley et al. | |
| 6,560,569 B1 * | 5/2003 | Abu El Ata | 703/2 |
| 2001/0041996 A1 | 11/2001 | Eder | |
| 2004/0128618 A1 * | 7/2004 | Datta | 715/513 |

OTHER PUBLICATIONS

Ata, N., "How Metrics and Models Made Architecture Real," presented at DCI Conference in Washington, D.C. in Feb., 2000 (slides 1-21).

Menasce, D., et al., "Capacity Planning and Performance Modeling", 1994, Prentice-Hall, ISBN 0-13-035494-5.

Agrawal, S., et al., "The aggregate server method for analyzing serialization delays in computer systems", ACM Transactions on Computer Systems, vol. 1, Issue 2, pp. 116-143, May 1983, ISSN: 0734-2071.

Compaq Open VMS Documentation, "TCP/IP Networking on Open VMS Systems", Nov. 1996, URL: http://www.openvms.compaq.com:8000/ssb71/6436p.htm.

Altmann, M., "A list of software for computer simulations", Last updated, Nov. 11, 1996, URL: http://www.nmsr.labmed.umn.edu/~michael/dbase/outgoing/FAQ.html.

Keshav, S., "Real 5.0 Overview", Aug. 13, 1997, URL: http://www.cs.cornell.edu/skeshav/real/overview.html.

Keshav, S., "Real 5.0 User Manuel", Aug. 13, 1997, URL: http://www.cs.cornell.edu/skeshav/real/user.html.

Keshav, S., "Real 5.0 Programmer's Manual", Aug. 13, 1997, URL: http://www.cs.cornell.edu/skeshav/real/prog.html.

Keshav, S., "Real 5.0 Changes", Aug. 13, 1997, URL: http://www.cs.cornell.edu/skeshav/real/changes.html.

Keshav, S., "Real 4.0 Programmer's Manual", Oct. 21, 1993, URL: http://minnie.cs/adfa.oz.au/REAL/prog.asc.gz.

Keshav, S., "Real 4.0 User's Manual", Oct. 21, 1993, URL: http://minnie.cs,adfa.oz.au/REAL/user.asc.gz.

Choukri, T., "cv_choukri.htm", 1999. URL: http://www.global-coms.com/consultants/cv_choukri.htm.

"BMC Software BEST/1," http://www.bgs.com (Updated: Apr. 10, 1998), 1 pg.

"About BEST/1," http://www.bgs.com/bgs.htm (Printed Out: May 21, 1998) 1 pg.

"BMC Software to Acquire BGS Systems," http://www.bgs.com/bmcbgs.htm (Printed Out: May 21, 1998), 3 pgs.

"Performance and Capacity Management, BEST/1-Visualizer for AS/400," http://www.bgs.com/as400/as4_home.htm (Printed: May 21, 1998), 2 pgs.

"BEST/1-Visualizer for AS/400, Product Description," http://www.bgs.com/as400/Slid_2.html (Printed Out: May 21, 1998), 2 pgs.

"BEST/1-Visualizer for AS/400, Bottleneck Detection and Analysis," http://www.bgs.com/as400/Slid_3.html (Updated: Nov. 22, 1996), 2 pgs.

"BEST/1-Visualizer for AS/400, Threshold Exception Reporting," http://www.bgs.com/as400/Slid_4.html (Updated: Jan. 23, 1997), 2 pgs.

US. Trademark Electronic Search System, search result for Trademark Serial No. 74555204. Nov. 27, 2001.

Ata, N., "A Predictive Modeling Approach to Developing Complex Systems", CSC Leading Edge Forum, Mar. 6, 2001, URL: http://www2.csc.com/lef/programs/forum/mar_01.htm.

Ata, N., "System Performance Modeling", ITC Meeting Minutes, Dec. 2, 1999, URL: http://www.istis.unomaha.edu/itc/meetings/m991202.htm.

Ata, N., "CMG97 Session Descriptions by Subject Area", CMG97 Orlando, The Computer Measurement Group's 1997 Int'l Conference, Dec. 7-12, 1997, URL: http://www.cmg.org/cmg97/cmg97sessions.html and http://www.cmg.org/cmg9/97Workload.pdf.

"BEST/1-Visualizer for AS/400, Track and Trend Long-term Performance," http://www.bgs.com/as400/Slid_6.html (Printed Out: May 21, 1998) 2 pgs.

"BEST/1-Visualizer for AS/400, CPU/System Graphs," http://www.bgs.com/as400/Slid_8.html (Updated: Nov. 29, 1996, 2 pgs.

"BEST/1-Visualizer for AS/400, I/O Subsystem Graphs," http://www.bgs.com/as400/Slid_9.html (Updated: Nov. 30, 1996), 2 pgs.

"BEST/1-Visualizer for AS/400, Storage Pool Graphs," http://www.bgs.com/as400/Slid_11.html (Updated: Nov. 22, 1996), 2 pgs.

"BEST/1-Visualizer for AS/400, Communication Line Graphs," http://www.bgs.com/as400/Slid$_{13}$ 12.html (Updated: Nov. 30, 1996), 2 pgs.

"BEST/1-Visualizer for AZ/400, Job Graphs," http://www.bgs.com/as400/Slid_13.html (Updated: Jan. 22, 1997) 2 pgs.

"The Portable Simulation Initiative and the Common Modeling Framework," http://www.ses.com/psi-cmf.html (Updated: Apr. 3, 1998), 3 pgs.

"SES —Products and Services: Why Simulate?" http://www.ses.com/whysimulate.html (Updated: Apr. 2, 1998), 7 pgs. from Capacity Management Review, vol. 36, No. 2, Feb., 1998.

"SES in the Press," http://www.ses.com/news/html (Updated: Apr. 8, 1998), 3 pgs.

"SES Inc. Announces Release of Strategizer", http://www.ses.com/pr_archive/010297.html (Updated: Jul. 14, 1997, 2 pgs.

"SES Releases SES/Workbench 3.1," http://www.ses.com/pr_archive/022896.html (Updated Jul. 14, 1997), 3 pgs.

"SES/workbench: Workbench Overview," http://www.ses.com/workbench.html (Updated: Feb. 10, 1998), 3 pgs.

"SES/objectbench: Batch Execution," http://www.ses.com/Objectbench/sim_details_batch.html (Updated: Apr. 6, 1998), 2 pgs.

"SES/objectbench: The Objectbench Animated Simulator," http://www.ses.com/Objectbench/simulator.html (Updated: Apr. 15, 1998), 2 pgs.

"SES/objectbench," http://www.ses.com/Objectbench/index.html (Updated Apr. 6, 1998), 2 pgs.

EETimes: Intel, Others Eye Performancee Modeling Standard, http://www.techweb.com/se/directlink.cgi?EET19971103S0105 (Nov. 3, 1997), 2 pgs.

"Euroexpert: Best Practices: France Telecom," Euroexpert SA, Antony, France (Sep. 1, 1997), 2 pgs.

"Simulation modeling within workflow technology," Miller, et al., Proceedings of the 1995 Winter Simulation Conference, Dec. 3-6, 1995.

"Analyzing and re-engineering business process using simulation," Bhskar, et al., Proceeding of the 1994 Winter Simulation Conference, Dec. 11-14, 1994.

"BEST/1-Visualizer for AS/400, Workload Analysis," http://www.bgs.com/as400/Slid_5.html (Updated: Jan. 23, 1997), 2 pgs.

Gunther, N., "The Practical Performance Analyst: *Performance-by-Design Techniques for Distributed Systems*", McGraw-Hill, Table of Contents only consisting of 9 pages, 1998.

"Model Driver Architecture (MDA) Document No. ormsc/2001-07-01", Architecture Board ORMSC, pp. 1-31, Jul., 2001.

Grady, R., et al., "Software Metrics: Establishing A Company-Wide Program", Prentice-Hall, Inc., Table of Contents only, consisting of 5 pgs., 1987.

Jacobson, I., et al., "Software Reuse, *Architecture Process and Organization for Business Success*", ACM Press, Table of Contents only, consisting of 9 pages, Addison-Wesley, 1997.

Bontempo, et al., "Data Management Principles and Products", Prentice Hall, Inc., 1995, Table of Contents only, consisting of 10 pages.

Soley, R., et al., "Model Driven Architecture" *Object Management Group*, pp. 1-12 (Nov. 27, 2000).

Hutchins, G., "ISO 9000, A Comprehensive Guide to Registration, Audit Guidelines, and Successful Certification" (Oliver Wight Publications, Inc.) 1993, Table of Contents Only consisting of 5 pages.

Lazowska, E., et al., "Quantitative System Performance: *Computer System Analysis Using Queueing Network Models*", Prentice-Hall, Inc., 1984, Table of Contents Only consisting of 8 pages.

Beck, K., "Extreme Programming Explained", Addison-Wesley 2000, Table of Contents Only consisting of 7 pages.

Sarris, D., et al., "The White Papers: *Capacity Planning for e-Commerce Systems With Benchmark Factory™*", http://www.quest.com/whitepapers/cap_plan_Ecomm.pdf, pp. 1-19. No date given.

Leymann, F., et al, "Production workflow: concepts and techniques", 2000, Table of Contents Only consisting of 14 pages.

"PYRAMID: Quantitative management: get a grip on software!" 100 pages, 1991.

Shaw, M., et al., "Software Architecture: *Perspectives on an Emerging Discipline*", Prentice Hall 1996, Table of Contents only consisting of 7 pages.

"EuroExpert GATE™ MODEL Product Description: *A predictive approach to efficient information systems*", pp 1-21, 1994.

Rolia, J.A. and K.C. Sevcik, "The Method of Layers," *IEEE Transactions on Software Engineering* 21(8):689-700, Aug. 1995.

White, R. V., "An Introduction to Six Sigma with a Design Example," *Applied Power Electronics Conference and Exposition*, 1992. *Conference Proceedings 1992, Seventh Annual*, Feb. 23-27, 1992, pp. 28-35.

"EUROEXPERT—Best Practices: French Social Security—UNEDIC", http://www.accretivetechnologies.com/documents/UNEDIC,PDF, Euroexpert and Gate(TM), 1992 Best Practices.

* cited by examiner

SYSTEMS AND METHOD FOR DETERMINING PERFORMANCE METRICS FOR CONSTRUCTING INFORMATION SYSTEMS

RELATED APPLICATION(S)

This application claims the benefit of U.S. Provisional Application No. 60/142,313 filed Jul. 2, 1999, the entire teachings of which are incorporated herein by reference.

BACKGROUND OF THE INVENTION

For the last twenty years, a tremendous amount of investments have been lost due to unsuccessful projects in different sectors of activity that are highly dependent on information systems. For the majority of these projects the main reason is the absence of predictive capability that might help early enough to prevent later on a performance crisis.

Much of the software development is performed on an ad hoc basis or at least in a customizing approach. Typically there are no feedback loops close to the design stage to prevent ultimate substandard results in the final product, e.g. an information system.

SUMMARY OF THE INVENTION

The present invention fills the gap of the prior art and helps the information system designer to predict the performance of his/her design and to modify the design to fit a predefined performance level. A quantitative iterative process is used to modify the information system design to achieve a desired performance level.

The present invention is formed of two parts. The first part establishes the base for a model-based architecture information system. In the information system architecture model, decisions are based on quantitative as well as qualitative evaluations of architecture options and on the limits associated with different alternatives.

The second part is directed to the mathematical process that assists the information system designer, in general, and the database administrator in particular, in experimenting and evaluating the different options to build efficient, scalable, optimal throughput and optimal cost information systems. It also solves one of the most difficult problems in information systems architecture that concerns the multilayer memories management.

The two parts of the preferred embodiment represent complementary pieces of the same exercise. The present invention targets a new approach that allows a smooth translation of a business need into a data model that helps the designer to determine early in the construction life cycle, the efficiency of the proposed (target) information system.

Accordingly, the present invention presents an original process to help designers of new performance critical information systems architectures to apply an analytical and mathematical approach for efficient and predictable numerical evaluations. The evaluation process covers (i) a discovery analysis to define the optimal selections of design scenarios, (ii) a sensitivity analysis to help the selection among different options, (iii) the project management to optimize the use of resources, and finally (iv) a stress analysis to determine the limits of the new systems.

In a preferred embodiment, an optimal IS (information system) architecture for a business entity is produced by the process of: in a first level of abstraction, modeling operations of a subject business entity; in a succeeding and less abstract level of abstraction, modeling software elements (structure and components) for carrying out the business entity operations; in a next less abstract level of abstraction, modeling physical requirements to support the software elements; and in a lowest level of abstraction, modeling technical infrastructure to determine an IS architecture meeting desired performance criteria. Preferably the step of modeling physical requirements is independent of computer platform and operating system and includes the modeling of data requirements, constraints and communications requirements. The step of modeling technical infrastructure is with respect to or dependent on computer platform and operating system. The desired performance criteria are defined at the various levels of abstraction and the process further preferably iterates through the modeling of physical requirements and modeling of technical infrastructure until the desired performance criteria are met.

With respect to another aspect of the present invention, the step of modeling the technical infrastructure includes generating alternative IS architecture designs meeting the performance criteria and the process further includes the step of evaluating implementations of the alternative IS architectures. Preferably a numerical analysis is used for evaluating implementations of the alternatives such that a quantitative relative comparison between alternatives is made and an optimal IS architecture results.

In accordance with another aspect of the present invention, the process further comprises the step of, over time, continually refining the IS architecture meeting the desired performance criteria (e.g., the optimal IS architecture) by remodeling the physical requirements and the technical infrastructure.

According to the foregoing, apparatus of the present invention for designing an optimal IS architecture of a business entity comprises (a) a model generator for producing one or more models representing the business entity's IS architecture needs at different levels of abstraction, at least one model representing an IS architecture design meeting desired performance criteria of the business entity; and (b) an optimizer coupled to receive the at least one model and evaluate, in a numerical manner, implementations of the corresponding IS architecture such that an optimal IS architecture is determined. The model generator preferably produces (i) a business process model representing business operations of the business entity, (ii) an applications model representing software elements (structure and components) for carrying out the business operations, (iii) a data model representing physical requirements to support the software elements, (iv) a technical infrastructure model representing an IS architecture design for implementations meeting the physical requirements.

In a preferred apparatus of the present invention, a refinement member continually refines the optimal IS architecture by iteratively remodeling and evaluating the IS architecture's design alternatives through the model generator and optimizer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

In a business entity or organization, information is communicated, stored and shared across various channels and means. Generally, the hardware and software components involved in the tracking, processing and recording of such business information is referred to as the information system. The structure and interdependence/interaction of supporting equipment and applications components (hardware and/or software), policies and protocol forming the information system is referred to as "the information system (IS) architecture".

The present invention provides a design methodology and tool for designing optimum IS architectures and optimal IS configurations. In general, the design approach of the present invention starts at a high level of abstraction and moves toward technical requirements to meet a business entity's needs. The first level of abstraction considers business operations referred to as "processes" and "subprocesses". The succeeding level of abstraction couches the processes in terms of application software solutions and components. A next level identifies the physical requirements (e.g., processing speed, memory, storage, etc.) to achieve and support the processes and corresponding application/software components. A final level determines platform specific components/hardware and alternatives. The alternatives provide an iterative feedback loop through the various levels of abstraction and supports "what-if" designing/brainstorming. Comparisons of alternatives and what-if scenarios are with respect to performance criteria at each level, such that an optimal IS architecture and configuration is achieved.

Figure 1:
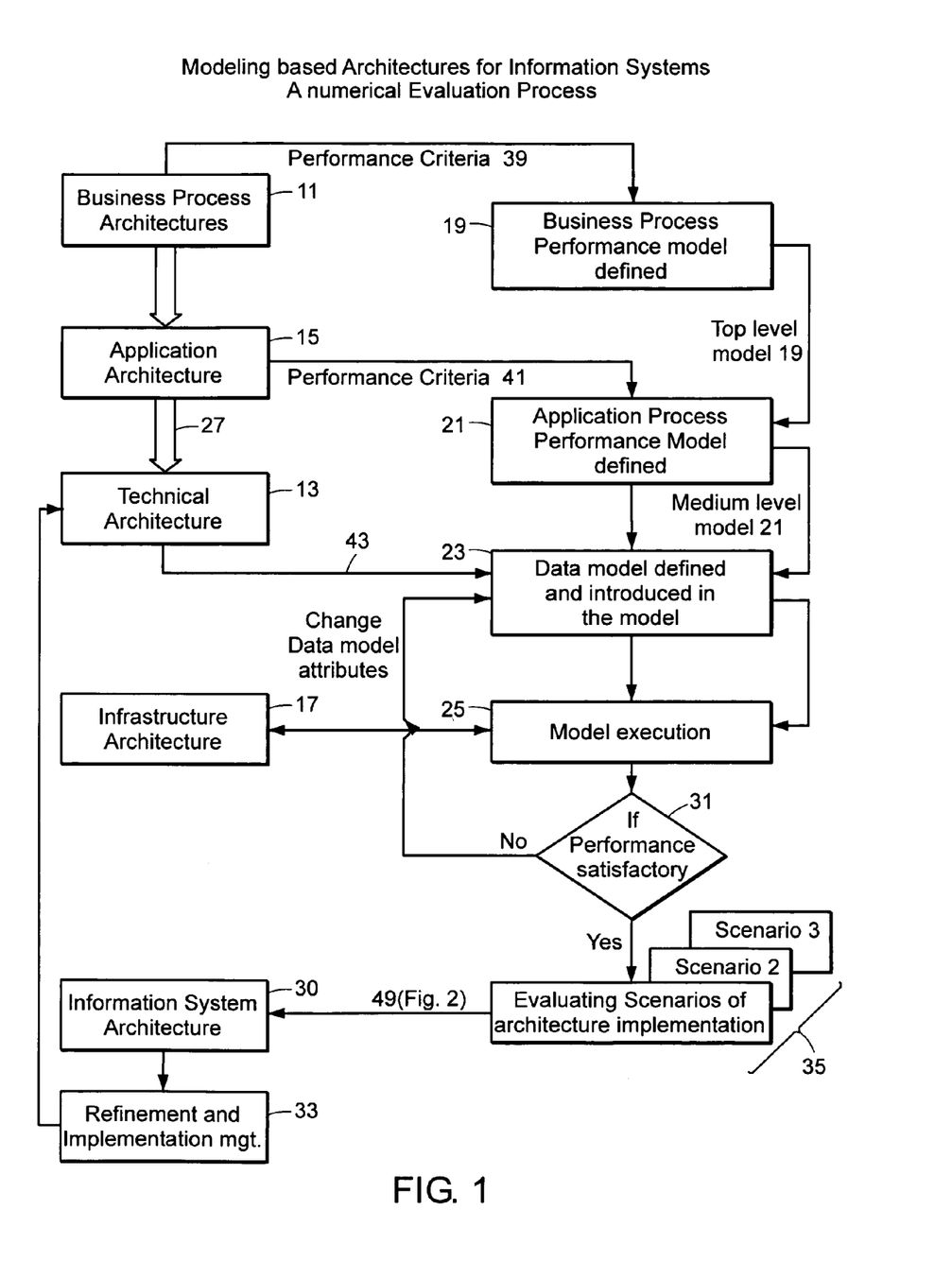
FIG. 1 is a schematic diagram of a system and method embodying the present invention.

FIG. 1 is illustrative of a preferred embodiment of the invention employing the foregoing design methodology and levels of abstraction, to configure an optimal IS architecture and configuration. Math models are defined and utilized at each layer/level based on the performance criteria determined for the respective level. Outputs from these models enable optimization at each level and in combination enable optimization of the overall IS architecture.

As illustrated in FIG. 1, the IS architecture is a compound of four layers, namely the Business Architecture Layer 11, the Application Architecture Layer 15, the Technical Architecture Layer 13 and the Infrastructure Architecture Layer 17. Each layer has its own (i) definition, (ii) lifetime window and associated tools, (iii) techniques and (iv) performance criteria.

Applicant has discovered that mixing notions and responsibilities among the architecture layers and components produces confusion and delays a robust and secure implementation of a new information system architecture. Applicant believes that the modeling approach is the only way to avoid such confusion. Creating a new IS architecture is a business planning exercise. The collaboration of different departments of the organization is mandatory. A successful IS architecture is the one that rationalizes conflicts between enterprise-wide objectives and project-specific objectives and is able to move comfortably to the satisfaction of both. It also interacts with clients to explain technical issues and solutions, and relates them to recognized business drivers.

In order to define a new information system architecture, a few prerequisites need to be satisfied as follows:

The main architecture driver is a business need. The business profile in terms of content and evolution trend should be defined. The associated quality and modes of operations should be identified. And all permanent and volatile drivers should be fixed.

In most cases, the new architecture is different from the actual. A new IS architecture is a great opportunity to redraw the whole picture. Partial definition might create confusion in the short term and complexity in the long term.

The phased construction of an IS architecture should be goal oriented. Its evaluation and selection between options should be based on a criteria matrix. This matrix is defined as the correlation between the organization critical factors (such as the cost per transaction, the tps (transactions per second), scalability) and the risk factors (such as ability to upgrade or add new processes, technology obsolescence, rapid aging factors).

While separating the different layers of an IS architecture, a mechanism of communication between responsibilities should be in place (Organization's Architecture Steering Group). The role of this communication mechanism is mainly to arbitrate. Again, a clear method of selection should be based on the criteria matrix.

As the IS architecture covers a long view of the future, a technology watch function should feed its independent vision to the debate. The technology cycle is in general shorter than the life span of the IS architecture. The adoption of a conservative approach towards the technology should be seen only as a tactical solution in an incremental and secured strategic technology vision.

The new IS architecture embodies the organization's business vision. The cooperation of different units of the organization within this frame is a guarantee for the success and the future appropriation of the resulting solution. However, this cooperation should not affect the consistency between the different elements constituting the IS architecture.

Returning to FIG. 1, the definition of the scope and content of each of the architecture layers 11, 13, 15, 17 represents the levels of involvement and responsibilities of different components of an organization in the definition of the new architecture. The new IS architecture becomes therefore able to represent and to accompany the organization vision to its future. For each layer, the following scope and responsibilities are determined.

The Business Architecture Layer 11 is the layer that represents the organization's business vision. The architecture here translates the business plan into an urban structure (i.e., overall or global architecture) that transforms the vision into processes. This layer is responsible for the definitions of the business processes of the organization, scope identification, content of each process (sub processes and functions), the intercommunication among processes (and sub-processes and functions) and their interdependencies. At this level, the performance and cost criteria are accurately defined.

Usually, the business partners and the competitive analyses are the sources from which to collect the business metrics necessary for the Business Architecture Layer 11 definition. However, trend analysis and surveys are also invaluable sources of information. Digesting this information is a continuous activity that might impact "the global picture" (i.e., overall IS architecture), which is the principal base of the Business Architecture Layer 11. In particular, it is of major importance to proactively identify phenomena like process transformation, new functions within a process, possibilities of consolidation and merges between processes and the expected trends in the mode of operation to enable the right time to construct and market to be identified. The outcome of this layer 11 feeds directly into the next layer (Application Architecture Layer 15) and represents the framework for all other layers 13, 17.

While the global picture might undergo changes over time, generally these changes are reflected in the lower layers. In most industries, a major change in the Business Architecture Layer 11 will be observed over a long period of time (10 to 15 years). It is however indispensable to continuously revisit this layer 11 to maintain the vision and proactively assess potential modifications. From an operational point of view, this layer 11 provides the framework, i.e., performance/quality metrics, business drivers as well as the process structure and communication network, of the following layers 13, 15, 17.

In the preferred embodiment, the Business Architecture Layer 11 is technology independent, flexible to allow for change, dependable, extendable and manageable and able to deliver desired business performance values. These are the preferred requisite performance criteria 39 of this layer 11. Other performance criteria 39 include time to market, flexibility, enhanceability, ease of change/scalability and efficiency.

Based on these criteria, the system designer forms a corresponding Business Process Performance model 19. This is a top level model portion in the overall IS architecture model 25. Model 19 contains detailed definitions of the business processes and their characteristics, e.g., dependency on external events, interdependencies, etc. The model 19 also contains assumption-based models to represent the three lower layers 15, 13, 17. Components for the assumption based models are from a preexisting library of corresponding models and physical components as disclosed in U.S. patent application Ser. No. 09/127,191 filed Jul. 31, 1998 and herein incorporated by reference. The designer may also use the system disclosed in U.S. patent application Ser. No. 09/127,191 to define Business Process model 19 as well as the math models for the other layers 15, 13, 17 in turn discussed below.

Next is the Application Architecture Layer 15. For a number of years, this layer 15 was part of a larger domain called system architecture. Typically, this layer 15 was not distinguished from the technology (physical requirements and platform) domain. This became impossible with the explosion of varieties and choices in computer system architecture and the unstable ground in the computer technology arena.

Over the last ten years, all successful information system re-engineering became possible in cases where a clear border was drawn between the application architecture and the infrastructure underneath. This became not only a management imperative but also a necessary target as the frequency of change on the infrastructure layers is much higher to allow an efficient and economic application architecture. Some architects call this layer 15 the conceptual architecture with narrower content to what is discussed here.

The Application Architecture Layer 15 is the translation of both the business functions and processes into computer application structures/components. Not only is the computer application architecture proposed but also the road map to how one translates the business layer 11 quality and performance criteria 39 into quantitative requirements and qualitative indicators is defined in this layer 15. The two sides of this translation become necessary to develop a robust and high quality computer application that continuously matches the business need. There is a many-to-many correspondence between business processes of layer 11 and application components of Application Layer 15.

Mainly what is output (at 27) by the Application Architecture Layer 15 is a blueprint on how the computer application architecture is distributed vertically (application layers such as presentation layer, management, logic, data, and associated communication) as well as horizontally (cycles corresponding to back office activity, mid and front office, client access, etc.) At this level of the overall IS architecture, the performance metrics are introduced and evaluated in all stages until the end of the life of the computer application (to determine aging, throughput limits, servicing quality and cost). These performance attributes serve as prerequisites in the definition of the next layers 13, 17 and in particular for the Technical Architecture Layer 13. In this layer 15, part of a data model 23 (discussed below) is defined and the associated performance and operational conditions of the data strategies are determined.

The most important performance criteria 41 here is openness. The Application Architecture Layer 15 should allow the highest degree of freedom towards the technical and technology infrastructure layers 13, 17. Other performance criteria 41 include flexibility, enhanceability, adaptability and dependability. Technology independence (or as much as will be able to be achieved) should also be a target for this layer 15. It is however difficult to ensure success in this area if the next layers 13, 17 choose a proprietary technology. Proprietary technology will not make use of all possibilities of the Architecture Layer 15 technology.

Based on the above performance criteria 41, the IS architecture designer defines an Application Process Performance Model 21 that corresponds to the output 27 of Application Architecture Layer 15. That model 21 is considered to be an intermediate or medium level model portion of the overall IS architecture model 25. The model 21 simulates delays, tensions, bottlenecks, etc., of the design (blueprint) output of Layer 15. If there is any conflict, the model 21 reveals what application components need altering, substitution or upgrading. The model 21 also shows suitability of application components for respective business processes as modeled at 19 in the Business Process Layer 11.

It is noted that model 21 executes with assumption-based models representing lower layers 13 and 17 similar to that described above for model 19 but does not likewise need to assume a model for top layer 11. Instead, model 19 as defined for layer 11 is included in the execution of model 21. That is, as models 19, 21, 23, 25 for the various layers 11, 15, 13, 17 are defined, they are employed respectively instead of the assumption-based models during the design of each level of the IS architecture in FIG. 1.

In any case, the lifetime for the Application Architecture Layer 15 follows that of the business plan/Business Process Layer 11 (10 to 15 years). One can easily imagine at least three or four cycles of technology changes during that time. A robust application architecture 15 should allow this technology adaptation process without jeopardizing performance or degrading the cost impact on the business entity.

The Technical Architecture Layer 13 translates the high level definitions produced in the preceding layers 11, 15 into physical definitions. Major choices in terms of interfaces, monitoring and data management alternatives are determined, modeled and/or prototyped here. While this layer 13 is obviously a technology dependent one, it is of great importance and responsibility of the project management (the project is well defined and engaged at this level) to determine the degree of possible obsolescence and the associated lifetime for a technology. The considerations involved in technology layer 13 are not platform dependent, i.e., determinations at this layer 13 should be made without regard to or independent of platform.

One of the most delicate activities within this layer 13 is the transformation of the logical structures and performance criteria identified in the above layers 11, 15 into physical requirements and implementation constraints. In particular, data and information structures are not merely introduced but described in detail here including metadata, storage, retrieval and security. Also transaction rate, memory capacity and speed, processing speed and similar physical requirements are defined here 13.

Further, the Technical Architecture Layer 13 describes the computer application and system management plans in view of the interaction of applications with the organization's system and workload management facilities. During this stage of overall IS architecture construction, there are tight definitions of the mechanisms to be used in order to ensure adequate system performance and growth are achieved. At this level, the data model 23 serves as the efficiency goalkeeper to predict the future implementation performance, propose alternative solutions and supervise the process up to the final delivery. The data model 23 also allows the optimization of the performance and availability metrics, to the highest potential of resource utilization, by proactively and analytically testing different scenarios of change (e.g., physical design of a relational database or degree of distribution of computer application components as a function of technology choices).

At this level 13 and as a result of the analyses, a number of standards are defined to suggest the optimal use of different techniques and tools in different situations. Obviously, definition of performance and availability versus cost criteria represent at this level 13 of the global architecture, a feedback to the higher layers 11, 15. Thus, the present invention IS architecture design method is an iterative process. This might help to adjust some of the attributes of the strategic planning (e.g., the impact of the surveillance batch system on the continuous quotation real time system in stock exchange led to the decision to re-engineer the process). Three to four years is the lifetime for such a layer 13, beyond which a re-engineering could become necessary.

With regard to performance criteria 43 for the Technical Architecture Layer 13, the operational quality and performance are the major concerns at this level. The quality is represented through the same attributes of the final product (IS architecture or overall system). These attributes are provided as a standard (ISO9000/126) covering six criteria, namely: efficiency, reliability, usability, maintainability, functionality and portability. In this standard, the performance is represented through the efficiency which also covers the availability and cost.

Indeed, the availability (or throughput) is the major criteria for high volume/high critical implementations; it is of equal importance to relate this criteria to the response and utilization criteria. Other performance metrics are the degradation, aging and productive ratios.

From the physical requirements determined at the Technical Architecture Layer 13, the designer generates physical data model 23. As in previous layers 11, 15, data model 23 includes previously defined models 19 and 21 and utilizes an assumption-based model to represent the Infrastructure Layer 17.

The Infrastructure Architecture Layer 17 is the technology layer. It is also the most volatile component of the overall IS architecture. It is the implementation of the physical architecture. At this level, the definitions and requirements produced in the preceding layers 11, 13, 15 are implemented, where the technological choices have been made and modeled by the corresponding models (i.e., the Business Process Performance model 19, the Application Process Performance model 21 and data model 23).

The choices here are concerning not only the hardware and network components but also the implementation language(s) selection, program/computer applications, techniques and standards to carry out the architecture direction. These choices are made as a function of platform, i.e., layer 17 is platform dependent.

The technical infrastructure needs to be reviewed every three months and to be changed as new offers come to the market and new standards evolve. For instance, one may find, in an infrastructure, products that are either in testing, evaluation, production, customization, or even in obsolescence.

A one to one mapping between physical architecture items (the physical requirements determined at layer 13) and technical infrastructure items is utilized. The technical infrastructure is slightly more detailed because it specifies devices, models, operating conditions and management mechanisms. However, too much platform-specific detail above the infrastructure make an architecture fragile against the very technological advances that boost physical performance and growth. A well designed physical architecture (at 13) allows the hardware, operating system, particular RDMBS (Relational Database Management System), etc. of layer 17 to be upgraded with no impact to the computer application construction characteristics of layer 15 and the consequent business processes of layer 11.

The performance metrics at this level 17 drive themselves directly from both physical definition of the IS architecture and the physical definition of the infrastructure components. Throughputs, speeds, response/elapsed times, rate of use and occupation and elongation values are the metrics that will help the scenario selection in this stage of the overall IS architecture.

The preferred embodiment utilizes the following analysis and modeling criteria for the overall model 25.

Communication mechanisms
Arrival patterns and rates
Data strategies
Infrastructure preferences
Architecture alternatives
Implementation options
Cost
Efficiency prerequisites
Risk factor
Accuracy Having made an initial definition of a new IS architecture with the foregoing layers 11, 13, 15, 17, the designer formulates overall model 25 of the proposed information system based on the foregoing performance metrics/criteria. At this stage, overall model 25 includes previously defined models 19, 21 and 23 (which have replaced any respective assumption-based models). Utilizing model 25, the present invention next evaluates design options relative to each other. The description of the new IS architecture (i.e., the data model 23) is provided as input to a modeling system described in U.S. patent application entitled "System and Method for Designing Information Systems", application Ser. No. 09/127,191, filed Jul. 31, 1998, the entire contents of which are incorporated herein by reference. That system in turn (i) executes the overall model 25, (ii) generates plural different (alternative) models 35 of the proposed information system and (iii) enables one to compare among alternatives 35 (i.e., between whole information system architectures as well as between alternative options within an information system architecture). That is, the modeling system's results drive the decision process and provide the justification for selection among different alternatives.

To illustrate the foregoing, the following example recites particular-steps in the invention method as applied to the banking industry. This example is for purposes of illustrating and not limiting the present invention. This example also generally follows FIG. 3 (detailed later) which illustrates the generic application/operation of the present invention.

Figure 3:
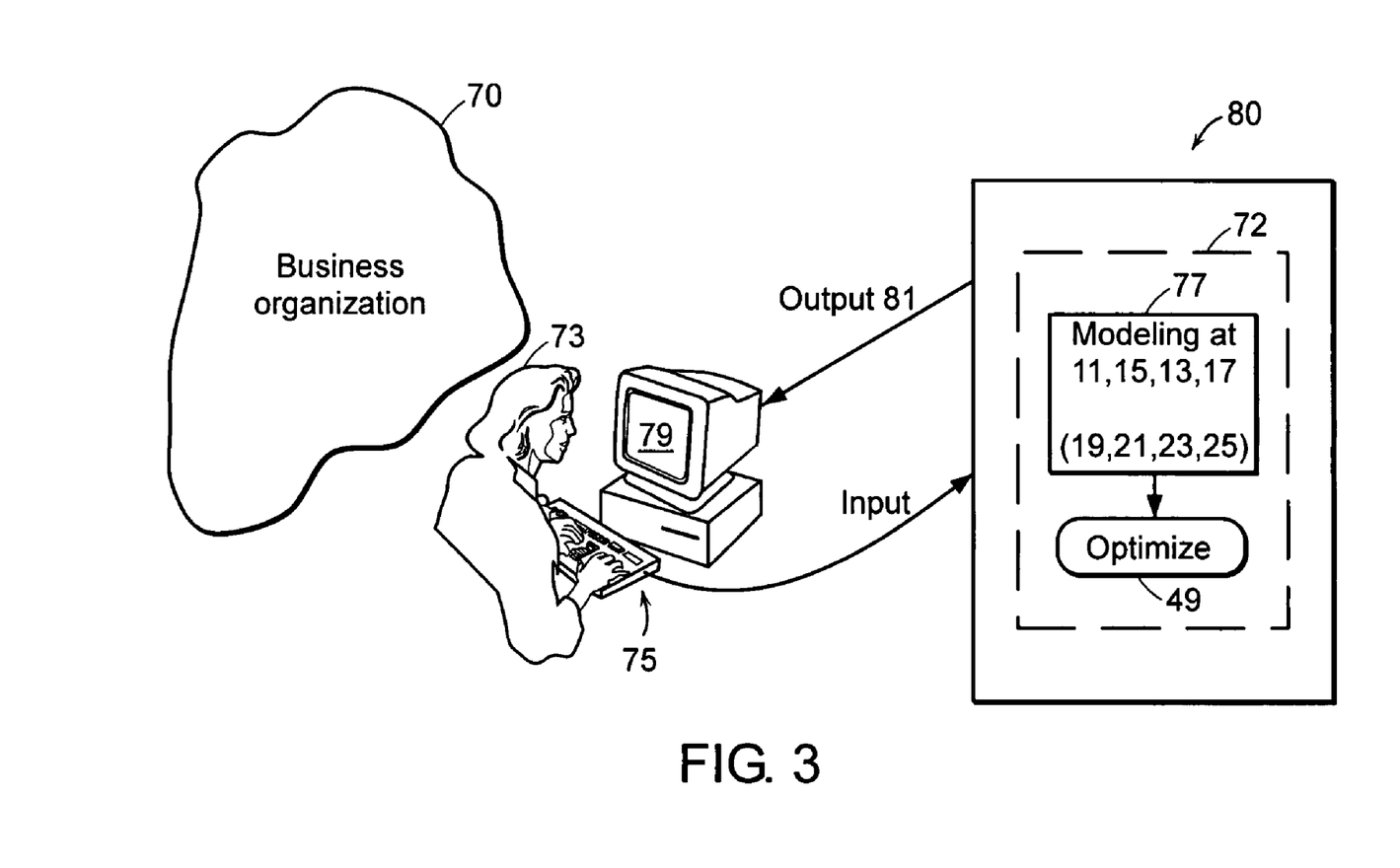
FIG. 3 is a schematic overview of a computer environment in which the present invention of FIGS. 1 and 2 operate.

In a bank 70 there are many customer services. There are services in savings accounts, mortgages, loans, financial management and so on. Each service is represented by a business process. Each business process has a respective definition that allows the bank 70 to manage an account or to manage service to a customer holding the account. For example, part of the definition may be on-time service (e.g., processing a loan application in fifteen days). If the market/competition is offering two-day loan application processing, then a constraint is defined in the business model 19.

The IS architecture designer/administration 73 accomplishes the foregoing using the following steps for each bank service.

Define the global business transaction
1. Identify volumes
2. Identify the mix weights
3. Categorize the transactions using the following criteria
   Business critical
   Long transaction/short inquiry
   Database weight
   Resource consumption weight (CPU, CPU and I/O, I/O)
   High frequency
   Specific time window
   SLA's dependency
   Other transaction dependency
   Cost (implementation, maintenance, ownership)
   Expandability
   Dependability
   Modifiability
   Openness Define the process at layer 11
1. Define the sub-processes
2. Define the time steps per process/sub-process
3. Define the dependencies and locks (inter and intra)
4. Define the performance constraints (critical path, external events, milestones, arrival/throughput, overall response, time and date to deliver Each business process (and corresponding service) has specific business rules and subprocesses for carrying out the service. The business rules are translated into specific computer/software applications by the designer 73. He likewise translates subprocesses into other software applications that may be in common with other business processes. So in the designing of the IS architecture, certain software applications will be common to many business processes. For example, management, account maintenance, credit line determination and interest rate determination are each business processes and may be translated to a common software application supporting these processes.

In turn, each software application looks for data, such as customer information, information triggered by a financial event or transaction, and the like. A good IS architecture design will enable efficient, timely and consistent access to this data. Thus, the design should support data representation in a variety of relationships.

Accordingly, the design engineer 73 takes the following steps to accomplish the foregoing.

Define the application software function
1. Map the business transaction to software application function
2. Define the segmentation of the application functions according to business processing portions
3. Map the defined segments of application functions into application and application components
4. Determine the required data and define the access strategies
5. Determine the volumes per transaction type, mix of weights per window of time
6. Categorize the application functions and map with the business transactions categorization Define the application architecture 15
1. Define the logical data model. Identify constraints
2. Define the application distribution model. Identify constraints
3. Define the application communication model. Identify constraints
4. Define the implementation criteria (based on the categorization and performance constraints)

Next, the designer 73 takes the following steps to
Define the technical architecture 13
1. Define the physical data model. Identify options
2. Define the application implementation model. Identify constraints
3. Define the communication model. Identify alternatives
4. Identify the implementation requirements and constraints
5. Identify model evolution trends and Define the technical infrastructure at layer 17
1. Consolidate the criteria for infrastructure selection
2. Define infrastructure alternatives
3. Evaluate the infrastructure options
4. Determine the limits and identify alternatives
5. Perform benchmarking studies
6. Assess efficiency versus cost
7. Set standards (technical and technology)

From this stage, the designer 73 observes what design portions are possible/feasible. As the designer 73 changes selections/tests alternatives 35 (FIG. 1), the overall model 25 from layer 17 guides the designer in selecting an optimal platform.

Certain of the foregoing information throughout the example is collected through interviews, documents, systems and industry, and feeds the model 25 as early as the user requirements are set. At the beginning of the development life cycle, the value of the model 25 resides in its ability to represent a final picture to the degree of knowledge the designer actually possesses, augmented by information allowed through model libraries. The accuracy of the model 25 results increase over time, but in all cases the model 25 is able to deliver the basis for a comparison among alternatives (relative errors are compensated).

FIG. 1 further illustrates the decision process given the foregoing alternative IS architecture models 25 and performance metrics. If the performance level is not satisfactory at step 31, then attributes of the data model 23 are changed. The revised data model 23 is then input into the modeling system to re-execute model 25 and generate additional modified models 25 and indications of corresponding performance for each model 25.

Figure 2:
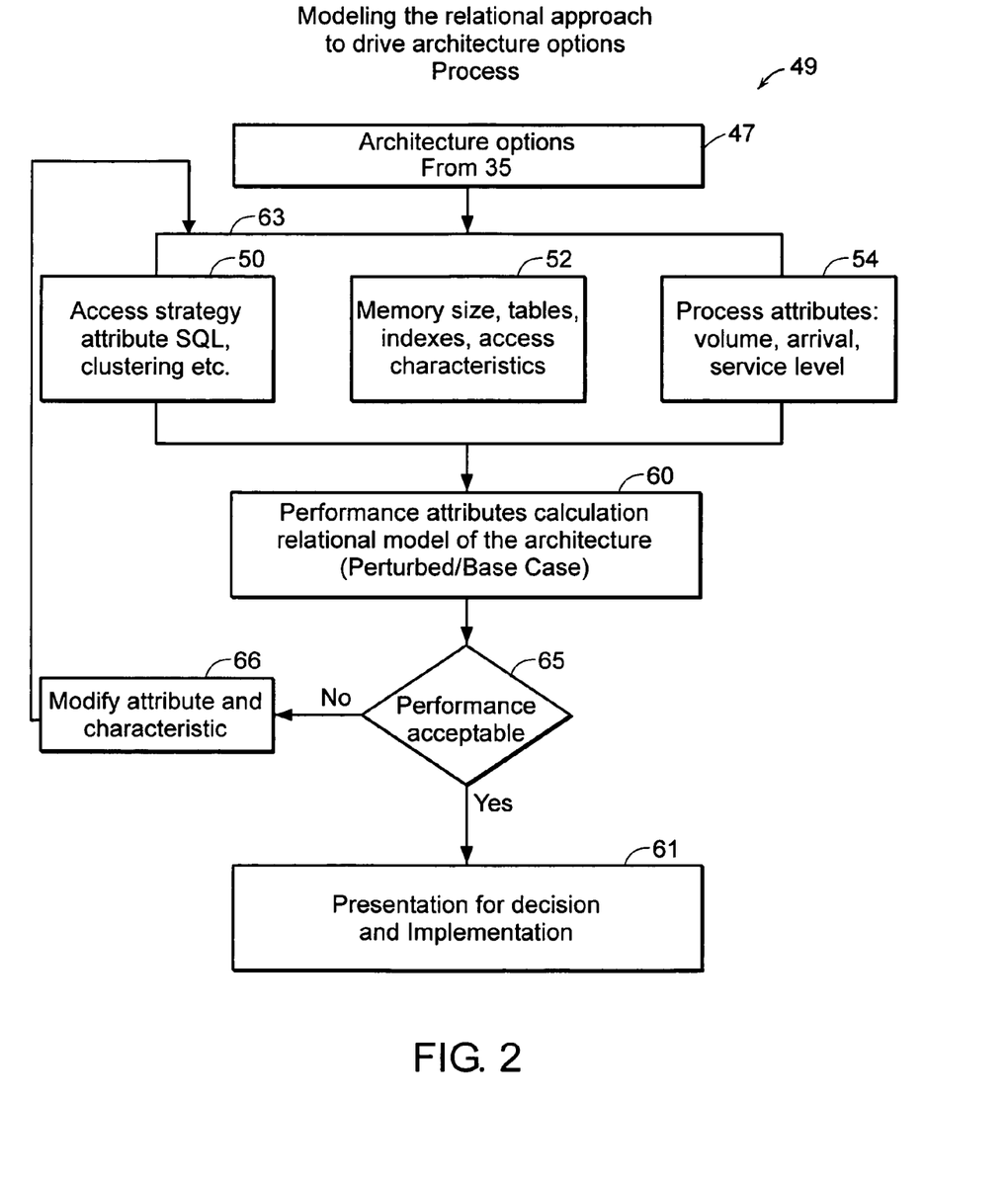
FIG. 2 is a flow diagram of the selection process of information system architecture options in the preferred embodiment.

If the performance level is acceptable at step 31, then various scenarios of architecture implementation are evaluated at step 35. The preferred evaluation is illustrated in FIG. 2 and discussed below. One IS architecture 30 is determined to be the best (optimal) in terms of technical and infrastructure implementation. That IS architecture 30 is further continuously (over time) refined at 33 which provides feedback to the Technical Architecture Layer 13. This feedback loop modifies data model 23 which is input into model 25. Additional model alternatives are generated and their performance measured at 31. As above, if performance is satisfactory, then an optimal IS architecture 30 is identified.

Key to the present invention is the obtaining of realistic numerical estimations on the behavior of systems that crucially allow the diagnosis of a choice and the selection of the pertinent architecture options. This holds especially for the configurations and the applications covering all memory layers in the proposed IS architecture. It is clear that obtaining the right representation (algorithms and attributes) will allow the user to predict, control and manage his/her design and implementation in the most reasonable, economic and predictable ways.

In most applications of mission critical information systems, the data and programs have their original copies and files on an external support, i.e., the information system employs a multi-platform memory architecture. The access to this support (disk subsystem, silos, etc.) requires a much longer time than the processing time of the central system on which the application is executed (due to speed of the processor).

Thus it becomes an objective to minimize the accessing of the external support and maximize the amount of data and files accommodated in a very fast accessible memory near to the processing engine. This is the main driver to the emergence of the layered memory architecture where each layer represents a memory much more rapid than the previous one, but consequently having less volume and capacity to accommodate only a portion of the candidate residing in the lower layers.

To further illustrate the present invention iterative method for modeling memory to enable best (optimal) selection of memory architecture in an IS architecture, say that the different memory characteristics are as follows:

The last memory where the machine code ready for execution by the instructions resides is known as "the Cache". The candidates to this memory are the programs in the central memory.

Central memory where the portions of the programs are residing under the control of the operating system. The candidates to this memory are the programs that reside either on an external support (disk subsystem) or in the extended storage adjacent to the central memory. At this layer, the memory is commonly known as the virtual memory.

In larger mainframes and vectorial and parallel systems a third level of memory exists, known as extended storage or background memory. It is much larger than the central one, but slower than and less tightly managed as the previous one. The candidates are also the programs and data files. In many systems, this memory serves as a temporary zone between the central memory and the external storages.

The next layer in those memories associated to the modern control units and commonly called "controller cache". Here the files recently accessed subsequent to a recent read or write are residing. The candidates are the files.

In the relational database systems, the pages of the tables recently accessed reside in subsets of memory with a variety of names (depending on the supplier term). The most commonly used are buffer-pool for DB2 and cache for Oracle. The candidates here are data in pages.

If the goal is for optimal response and efficiency, the solution includes multiplying the accesses on the fastest layers and rarefying the access to the slowest service. Evidently crisis and performance degrade should be expected if the accesses are not controlled and managed properly. The outcome is also very sensitive to the options adopted by the user (designer or administration). For the first two higher layers (central memory and extended storage), the lost engines and its operating environment (operating systems monitors and optimizers) perform most of the control and management.

To illustrate the explanation in the first wave of generations of technology, the central memory and large extended memories were different in size and speed. The former was very small and the speed of execution of two loops of identical instructions where only one is processed in the central memory, are enormously different. For these two layers, this impact is less aggressive today (the speeds are of the same order of magnitude and the sizes are much more important).

Similarly the first wave of virtual memories were very fragile and leading frequently to the memory thrashing phenomenon. This is becoming very rare today in most systems due to the sophistication of operating management and control algorithms, in addition to the size of these memories becoming larger by several orders of magnitude (compare CDC7600 with any one of the current technologies, using two processing memory levels).

Consequently, for systems like 113M's MVS operating system, the total weight of accesses to the virtual memory represents small portions of the workload (typically a few percent), so the problem is less critical at these layers.

It is not the case for three of the following layers, which are near to the user. Precisely, a relational database user might expect that the same inquiry at certain different time periods shows its cost doubled (or more) with no full predictive control of the resultant values.

Now turn to the present invention analytical representations and numerical iterative solutions. Consider an upper layer where attributes of portions of candidates from the layer immediately lower reside. As previously mentioned, these candidates are files, programs or tables. In the rest of this discussion, these candidates are referred to as "sets". The portions of these sets that could be selected independently to move to the next higher layer are called generally "pages", as referenced in the rest of this discussion.

Finally the higher layer is termed "active zone". This zone is, depending on the case, the "external storage" (or part of it), the "cache" (for Oracle) or "buffer pool" (for DB2) etc.

The ultimate goal of any installation (set of computer applications) or application is to minimize the overall cost of processing and consequently to rarefy the access to pages of the sets that reside in the lower layers of memory (which are more costly in time to access).

It is therefore interesting to estimate numerically the probability that a page one wishes to access has a copy in the active zone. Where the present invention utilizes algorithms that produce these values, it is possible to quantify the impact of a choice. For instance, it is possible to verify that a modification in the implementation of an application or a configuration will have a positive impact on the response and the degree (quantity) of this impact.

As a first step, the content of the active zone (the higher layer) is computed with the assumption that for each set, for each of its pages, the interval of time separating two successive references follow a Poisson law for a time independent parameter, and are identical for the whole set.

As a second step, the probability that a page is in the active zone is a determined quantity, which is called herein the "hit ratio". However, here are taken into consideration the phenomenon called "locality". It is the lifetime estimate. It is based on the fact that the lifetime of a page in the active zone is, or is not longer than the interval of time separating two successive references to the same page by the same transaction.

Computational Algorithm of the Content of the Active Zone.

Consider the sets j where j=(1, . . . z). The sets have a number of pages $Q_j$ out of which certain number $P_j$ are in the active zone.

The access to pages is generated by a number of processing units, namely $u_i(i=[1,y])$. A processing unit generates $a_{ij}$ access to distinct pages of the set $t_j$. Finally the rate of activation of the units $u_i$ in the system is $1_i$.

Suppose that the algorithm of replacement in the active zone is of type LRU (least recently used) and:

$T_0$ is the average age of a page to be replaced, and the distribution of access to a page follow a Poisson law of parameter $m_j$ (rate of access to a page) consider that $A_j$ is the probability that a page of the set j is in the active zone then:

$$Aj = prob(\text{age of the page} \leq T_0) = 1 - e^{-m_j T_0}$$

knowing the surface $S_j$ scanned by the set j, one has:

$$P_j = A_j S_j$$

and the rate of access to a page in the set j is:

$$m_j = \Sigma_{i=1,y} 1_i a_{ij} / S_j$$

Knowing $S_j$ one is able to compute its $P_j$, knowing that the sum of $P_j$ should equal the size of the active zone.

Starting from arbitrary $T_0$:

$$P = \Sigma_j P_j$$

Comparing with the size of the active zone; iterate the calculation with new $T_0$ (e.g., via linear interpolation) until identical values are obtained.

Next to calculate $S_j$ the following is employed. Let $S_j$ represent the surface of the table j "effectively scanned". Assume simply that $S_j$ represent all the set:

$$S_j = Q_j$$

Therefore:

$$P_j = Q_j \left[1 - e^{-T_0 \Sigma_{i=1,y} 1_i a_{ij}/Q_j}\right]$$

The above demonstration is applicable to random access memory. However, in a given transaction there exists multiple access to the page requested "just after". These pages have consequently a strong probability of being in the "active zone" ready for the next calls. Two cases are examined here. In the first case, referred to below as the "Base Case", assume that the pages recently referenced are always residing in the active zone. In the second case, called here the "Perturbed Case", applicant studies the impact of perturbation due to concurrent transactions activity.

Base Case

In fact, the locality for a transaction is represented on two levels. A transaction (from user's point of view) is represented generally as a sequence of processing units U, consistent among themselves and using partially the same pages. Moreover, these processing units are separated in time by few dozens of seconds. Consequently on one side exists an internal locality phenomenon for a processing unit and on the other hand a locality problem between the processing units for the same transaction.

In the Base Case applicant assumes that the two layers are represented through a strong probability that a page present in the active zone will be referenced again.

Taking into account the locality signifies that the size of the active zone is diminishing by the size taken by the transactions. Intuitively one may consider logically that the active zone is a composition of three zones:

a zone $z_1$ containing the pages which are referenced frequently a zone $Z_2$ containing the rest of the pages (i.e., those that are referenced rarely)

a zone $Z_3$ containing the pages of the current transactions

The hypothesis selected for this Base Case is then: the zone $Z_2$ is not empty. In this last zone, the next page is elected for replacement following the algorithm LRU (least recently used). This means that the calculation of the partitioning of pages in the active zone concerns only the sets of zones z, and $Z_2$. This new calculation is performed as follows:

Consider $L_t$ the surface used by transaction. If the transaction should access a total of $a_{tj}$ pages of the set j each page is counted once even if it is accessed by several distinct units where:

$$L_t = \Sigma_{j=1,z} a_{tj}$$

Assume that the surface $L_t$ used by the transactions is exactly equal to the number of distinct pages accessed by all the transactions. However if $d_t$ is the average execution duration of the transaction t and $1_t$ is its arrival rate, then the average number of transactions in execution is $1_t d_t$ and the size occupied by the transaction is on the average:

$$L_0 \Sigma_t 1_t d_t L_t$$

and applicant applies the previous calculation on the residual surface $C_0$ of the active zone:

$$C_0 = P - \Sigma_t 1_t d_t L_t = P - \Sigma_t 1_t d_t \Sigma_j a_{tj}$$

Next deduce the portions $P_{j,0}$ of the sets j residing in the active zone. Assume, as above, that the pages are selected uniformly in the set. Among pages $a_{tj}$, the portion $a_{tj} \times P_{j,0}/S_j$ is present in the active zone. Thus the occupied size $L_1$ by the transactions, including the portion already in the active zone, is determined by the following equation:

$$L_1 = \Sigma_t 1_t d_t \Sigma_j a_{tj} (P_{j,0}/S_j)$$

where $P_{j,0}/S_j = A_j$ and $A_j = 1 - e^{-m_j T_0}$ and therefore the new size of the residual surface of the active zone is:

$$C1 = P - L1$$

Iterate until $C_k - C_{k-1}$ becomes negligible. Finally, if the transaction t performs $n_t$ accesses (considering this time the access to same pages), there will be a global presence ratio H where:

$$H = \left[ \sum_t l_t d_t \sum_j a_{tj}(P_{j,k}/S_j) \right] / \sum_t l_t n_t$$

Perturbed Case

The above algorithm in the Base Case supposes that the zone $Z_2$ of rarely referenced pages exists. If it does not exist anymore, this means that in the active zone no page resides where the interval of time between two references is greater than the interval of time between two processing units of the same transaction. As a first step, consider that the last interval always concerns two successive processing units.

Assume the $I_0$ is the average interval of time between two successive processing units of a given transaction. There is perturbation if the probability that pages of the first processing unit are accessed before a period $I_0$, is not negligible. This could not happen unless the sum of necessary pages for locality on one hand and the set of pages having an average lifetime smaller or equal to $I_0$ on the other hand, is greater than the size of the active zone.

Assume:

$$L_k = \sum_j l_t d_t \sum_j a_{tj}(P_{j,k}/S_j)$$

The condition becomes:

$$C_{1o} + L_k > P$$

$C_{1o}$ may be obtained as above.

If this condition becomes unsatisfactory, the above calculation becomes inapplicable. The simplest hypothesis consists of considering that a processing unit should reload the totality of its pages that are not in the active zone, but let its proper (own) page rest. This means that the first locality level is not satisfied, but only the second level of locality stays.

In order to obtain the rate of presence, one should in this hypothesis accumulate all pages of each processing unit. Assume that the transaction $t_i$ is composed of processing units $t_{im}$ each access to $a_{imj}$ pages of the set j the formula becomes;

$$H = \left[ \sum_i l_i d_i \sum_{j,m} a_{imj}(P_{j,k}/S_j) \right] / \sum_i l_i n_i$$

This represents an important increase in the number of accesses for the next lower layer, which corresponds to a kind of first level of thrashing. Consequently, the durations $d_i$ of the transactions will be elongated. Therefore, the number of transactions concurrently in execution will increase, with an increase in the total size occupied by the sets of the locality. If this trend is produced for arrival rates $l_i$, the return back to a situation without perturbation will not be produced unless the rate of utilization $1_i'$ becomes less than 1. As the maximum allowed size for the locality=$P-C_{1o}$ is known, it is sufficient to find values for $1_i'$ such that:

$$P - C_{lo} > \sum_i l_i' d_i' \sum_{j,m} a_{imj}(P_{j,k}/S_j)$$

The probability to get to this level of non-locality is small and equal to small value q. It is sufficient therefore to restart the computation in replacing the average number of transactions $1_i' d_i'$ by the number $n_i q_i$ such as:

probability (for each transaction, number of transactions $i > n_i q_i$) = q

Finally some systems might exist with this level of non-locality with acceptable service quality. It is important here to define the limit of service. The limit is attained when the average lifetime in the active zone is less than the average execution time I of the processing unit. Where, the second level of non-locality is becoming unsatisfactory, define as before:

$$L_k = \sum_i 1_{i'di'} \sum_{j,m} a_{imj}(P_{j,k}/S_j)$$

with the condition:

$$C_1 + L_k' > P$$

According to the foregoing, the present invention provides an analytical approach to develop new information system architecture based on a proactive assessment of possible options. The assessment is based on the predictive computation of the quantitative and qualitative metrics that impacts the organization's performance. FIG. 2 summarizes this IS architecture options process.

Illustrated in FIG. 2 is the evaluation of options or scenario implementions at 35 in FIG. 1 to obtain an optimal IS architecture 30. At starting step 47 of routine 49, a subject option is given, in this example, a certain cache memory. Access strategy attributes are determined and indicated at 50. Access characteristics such as memory size, tables, and indexes are determined at 52. Corresponding business process attributes are identified at step 54 (e.g., transaction volume, service level, arrival needs).

The determined attributes and characteristics are used to define the variables in the foregoing equations describing the perturbed and base cases. The foregoing calculations (equations of these cases) are performed at 60. If the resulting quantitative analysis indicates acceptable performance (in terms of, for example, size, speed, etc.), then proceed through decision juncture 65 to output 61. That is, routine 49 shows/displays the subject option as a best selection.

If the quantified performance is not acceptable at 65, then modify (step 66) the attributes and characteristics or obtain another option from 35 (FIG. 1) and loop back to 63 to repeat the above steps. The routine 49 is repeated for each option at 35 (FIG. 1) and/or each modification 66 of attributes and characteristics 50, 52 and 54, until an acceptable and optimal option is found and output 61.

According to the foregoing, the present invention operates on descriptions of a business entity or organization 70 (FIG. 3) as represented at various levels of abstraction by a designer 73 in math modeling software 77 (from U.S. application Ser. No. 09/127,191). The designer 73 utilizes math modeling software 77 and routine optimizer 49 as described above in the invention methodology for achieving optimal IS design/architecture (output 81). In one embodiment, this means that designer 73 through input devices 75 (e.g., keyboard, mouse, etc.) to digital processor 80 executes software 77 and routine 49 in working or other memory 72 of processor 80. He 73 uses various data/information from the business entity 70 as input and obtains output 81 at various stages through output devices 79 (e.g., display monitor, printer, etc.). Some output 81 is used as feedback by the designer 73 to improve and ultimately optimize his IS architecture design as discussed in FIGS. 1 and 2 above (in an iterative process in the preferred embodiment.

It is understood that other digital processing systems/configurations are suitable for practicing the present invention.

While this invention has been particularly shown and described with references to preferred embodiments thereof, it will be understood by those skilled in the art that various changes in form and details may be made therein without departing from the scope of the invention encompassed by the appended claims.

For example, although optimization is discussed with reference to the memory layers of an IS architecture, it is understood that other components of the IS architecture may be similarly analyzed and optimized and illustrated in FIG. 2.

Also, although the foregoing discussion was directed to a database cache, similar analysis applies to cache of a disk, cache of a network/telecommunications and that of an embedded system or subsystem.

The process presented above may also help other industries to optimize their services and contribute toward satisfying the demand for high volumes of transactions, fast response and lower costs.

What is claimed is:

1. Apparatus for designing an optimal information system architecture of a business entity, comprising:
    a model generator for producing one or more models representing the business entity's IS architecture needs at different levels of abstraction, at least one model representing an IS architecture meeting desired performance criteria of the business entity; and
    an optimizer coupled to receive the at least one model and evaluate, in a numerical manner, implementations of the corresponding IS architecture such that an optimal IS architecture is determined, the optimizer modeling memory performance by determining a probability of accessing desired pages of page sets in an active zone memory, wherein the active zone memory includes a portion of rarely referenced pages, determining a probability of accessing the desired pages in the active zone memory comprises:
    for each page set, determining a probability of any page being present in the active zone memory;
    for each page set, determining a number of distinct pages accessed;
    for each page set, determining a number of pages present in the active zone memory from the number of distinct pages accessed and the probability of any page being present in the active zone memory; and
    determining a hit ratio as the number of pages present in the active zone memory relative to the total number of page accesses.

2. Apparatus as claimed in claim 1 wherein the model generator produces (i) a business process model representing business operations of the business entity, (ii) an applications model representing software elements for carrying out the business operations, (iii) a data model representing physical requirements to support the software elements, (iv) a technical infrastructure model representing an IS architecture design for implementations meeting the physical requirements.

3. Apparatus as claimed in claim 2 wherein:
    the business process model is at one level of abstraction;
    the applications model is at a succeeding and less abstract level of abstraction than the one level;
    the data model is at a next level of abstraction; and
    the technical infrastructure model is at a lowest level of abstraction.

4. Apparatus as claimed in claim 2 wherein the software elements represented by the applications model includes software components and structures.

5. Apparatus as claimed in claim 2 wherein the data model is independent of computer platform and operating system.

6. Apparatus as claimed in claim 2 wherein the physical requirements represented by the data model includes data requirements, constraints and communications requirements.

7. Apparatus as claimed in claim 2 wherein the technical infrastructure model is dependent on computer platform and operating system.

8. Apparatus as claimed in claim 1 wherein the desired performance criteria are defined at the various levels of abstraction.

9. Apparatus as claimed in claim 1 further comprising a refinement member for continually refining the optimal IS architecture by iteratively remodeling and evaluating the IS architecture through the model generator and optimizer.

10. A method for modeling memory performance, comprising:
    in a first level of abstraction, modeling operations in a subject business entity;
    in a succeeding and less abstract level of abstraction, modeling software elements for carrying out the business entity operations, including modeling the software elements accessing desired pages of page sets in memory during business entity operations;
    in a next less abstract level of abstraction, modeling physical requirements to support the software elements, including the physical requirements of an active zone memory, the active zone memory being upper memory providing temporary storage of pages accessed from page sets in lower memory;
    in a lowest level of abstraction, modeling technical infrastructure to determine an IS architecture meeting desired performance criteria; and
    determining a probability of accessing the desired pages of the page sets in the active zone memory during the business entity operations; wherein the active zone memory includes a portion of rarely referenced pages, determining a probability of accessing the desired pages in the active zone memory comprises:
    for each page set, determining a probability of any page being present in the active zone memory;
    for each page set, determining a number of distinct pages accessed during the operations of the subject business entity;
    for each page set, determining a number of pages present in the active zone memory from the number of distinct pages accessed and the probability of any page being present in the active zone memory; and
    determining a hit ratio as the number of pages present in the active zone memory relative to the total number of page accesses during the operations of the subject business entity.

11. An optimal information system architecture for a business entity, produced by the process of claim 10.

12. An optimal information system architecture as claimed in claim 11 wherein the step of modeling physical requirements is independent of computer platform.

13. An optimal information system architecture as claimed in claim 11 wherein the step of modeling physical requirements includes data requirements, constraints and communications requirements.

14. An optimal information system architecture as claimed in claim 11 wherein the step of modeling technical infrastructure is with respect to computer platform and operating system.

15. An optimal information system architecture as claimed in claim 11 wherein in the step of modeling technical infrastructure the desired performance criteria are defined at the various levels of abstraction.

16. An optimal information system architecture as claimed in claim 11 further comprising the step of iterating through the modeling of physical requirements and modeling of technical infrastructure until desired performance criteria is met.

17. An optimal information system architecture as claimed in claim 11 wherein the step of modeling software elements includes modeling software components and structures.

18. An optimal information system architecture as claimed in claim 11 wherein the step of modeling technical infrastructure includes generating alternative information system architecture designs meeting the performance criteria; and
further comprising the step of evaluating implementations of the alternative information system architecture designs using a numerical analysis for quantitative relative comparison between alternatives, such that an optimal information system architecture results.

19. An optimal information system architecture as claimed in claim 11 further comprising the step of continually refining the IS architecture by remodeling the physical requirements and the technical infrastructure.

20. The method as claimed in claim 10, further comprising:
modifying one or more of the abstract levels in order to increase the probability of accessing the desired pages in the active zone memory during the operations of the subject business entity.

21. The method as claimed in claim 10, wherein the probability of a page being present in an active zone is based on a page access rate of a corresponding page set and a page replacement age associated with the active zone.

22. The method as claimed in claim 21, wherein the page access rate and the page replacement age follow a Poisson law distribution.

23. The method as claimed in claim 10, wherein the active zone memory is cache memory.

24. The method as claimed in claim 10, wherein the active zone memory is at least a portion of external storage.

25. The method as claimed in claim 10, wherein the active zone memory is a buffer pool.

26. A method for modeling memory performance, comprising:
in a first level of abstraction, modeling operations in a subject business entity;
in a succeeding and less abstract level of abstraction, modeling software elements for carrying out the business entity operations, including modeling the software elements accessing desired pages of page sets in memory during business entity operations;
in a next less abstract level of abstraction, modeling physical requirements to support the software elements, including the physical requirements of an active zone memory, the active zone memory being upper memory providing temporary storage of pages accessed from page sets in lower memory;
in a lowest level of abstraction, modeling technical infrastructure to determine an IS architecture meeting desired performance criteria; and
determining a probability of accessing the desired pages of the page sets in the active zone memory during the business entity operations,
wherein the active zone memory is free of a portion of rarely referenced pages, determining a probability of accessing the desired pages in the active zone memory comprises:
for each page set, determining a probability of any page being present in the active zone memory;
for each page set, determining a number of all pages accessed during the operations of the subject business entity;
for each page set, determining a number of pages present in the active zone memory from the number of all pages accessed and the probability of any page being present in the active zone memory; and
determining a hit ratio as the number of pages present in the active zone memory relative to the total number of page accesses during the operations of the subject business entity.

27. Apparatus for modeling memory performance, comprising:
a model generator producing (i) a business process model representing business operations of a business entity, (ii) an applications model representing software elements for carrying out the business operations, including modeling the software elements accessing desired pages of page sets in memory during business entity operations, (iii) a data model representing physical requirements to support the software elements, including the physical requirements of an active zone memory, the active zone memory being upper memory providing temporary storage of pages accessed from page sets in lower memory, (iv) a technical infrastructure model representing an IS architecture design for implementations meeting the physical requirements; and
an optimizer determining a probability of accessing the desired pages of the page sets in the active zone memory during the business entity operations; wherein the active zone memory includes a portion of rarely referenced pages, the optimizer determining a probability of accessing the desired pages in the active zone memory comprises:
for each page set, the optimizer determining a probability of any page being present in the active zone memory;
for each page set, the optimizer determining a number of distinct pages accessed during the operations of the subject business entity;
for each page set, the optimizer determining a number of pages present in the active zone memory from the number of distinct pages accessed and the probability of any page being present in the active zone memory; and the optimizer determining a hit ratio as the number of pages present in the active zone memory relative to the total number of page accesses during the operations of the subject business entity.

28. Apparatus as claimed in claim 27, further comprising:
the model generator modifying one or more of the abstract levels in order to increase the probability of accessing the desired pages in the active zone memory during the operations of the subject business entity.

29. Apparatus for modeling memory performance, comprising:
a model generator producing (i) a business process model representing business operations of a business entity, (ii) an applications model representing software elements for carrying out the business operations, including modeling the software elements accessing desired pages of page sets in memory during business entity operations, (iii) a data model representing physical requirements to support the software elements, including the physical requirements of an active zone memory, the active zone memory being upper memory providing temporary storage of pages accessed from page sets in lower memory, (iv) a technical infrastructure model representing an IS architecture design for implementations meeting the physical requirements; and
an optimizer determining a probability of accessing the desired pages of the page sets in the active zone memory during the business entity operations, wherein the active zone memory is free of a portion of rarely referenced pages, the optimizer determining a probability of accessing the desired pages in the active zone memory comprises:
for each page set, the optimizer determining a probability of any page being present in the active zone memory;
for each page set, the optimizer determining a number of all pages accessed during the operations of the subject business entity;
for each page set, the optimizer determining a number of pages present in the active zone memory from the number of all pages accessed and the probability of any page being present in the active zone memory; and
the optimizer determining a hit ratio as the number of pages present in the active zone memory relative to the total number of page accesses during the operations of the subject business entity.

* * * * *